United States Patent [19]

Basso et al.

[11] Patent Number: 5,012,512

[45] Date of Patent: Apr. 30, 1991

[54] TELEPHONE OPERATOR AND AGENT TO DATABASE COMMUNICATION ARRANGEMENT

[75] Inventors: Richard J. Basso, Naperville; Randall S. Hansen, St Charles; Edward P. Kolasa, Streamwood; Mark L. Reynolds, Wheaton; Chun P. Tam, Naperville, all of Ill.

[73] Assignee: AT&T Bell Laboratories, Murray Hill, N.J.

[21] Appl. No.: 502,091

[22] Filed: Mar. 30, 1990

[51] Int. Cl.$^5$ .................... H04M 3/60; H04M 3/64
[52] U.S. Cl. .................................. 379/218; 379/96; 379/260; 379/265
[58] Field of Search .............. 379/309, 264, 265, 266, 379/260, 261, 96, 201, 207, 218

[56] References Cited

U.S. PATENT DOCUMENTS

| | | | |
|---|---|---|---|
| 4,529,841 | 7/1985 | Andersson et al. | 379/218 X |
| 4,776,005 | 10/1988 | Petriccione et al. | 379/96 X |
| 4,899,375 | 6/1990 | Baver et al. | 379/264 |
| 4,949,373 | 8/1990 | Baker, Jr. et al. | 379/266 |

Primary Examiner—James L. Dwyer
Attorney, Agent, or Firm—W. Ulrich

[57] ABSTRACT

This invention relates to a method and apparatus for communication between an operator or agent position and a switching system and databases. The position includes a display screen and keyboard. Data for controlling a plurality of displays for the screen is stored in the switching system. In response to an operator's logging into the system, the position is connected to a plurality of databases by switched virtual channels, carried over the data channel of an ISDN connection from the position to the switch, and via switched virtual channels to the databases. A special section of the screen is devoted to parameters which are automatically transferred from one display to another whenever a new display is requested. When an operator wishes to set up a call, the call will be set up in accordance with the latest version of the parameters, whether or not the operator requests a display of a call control screen. Advantageously, operator time is saved because the operator need not re-request a call control screen prior to requesting a call control operation.

23 Claims, 3 Drawing Sheets

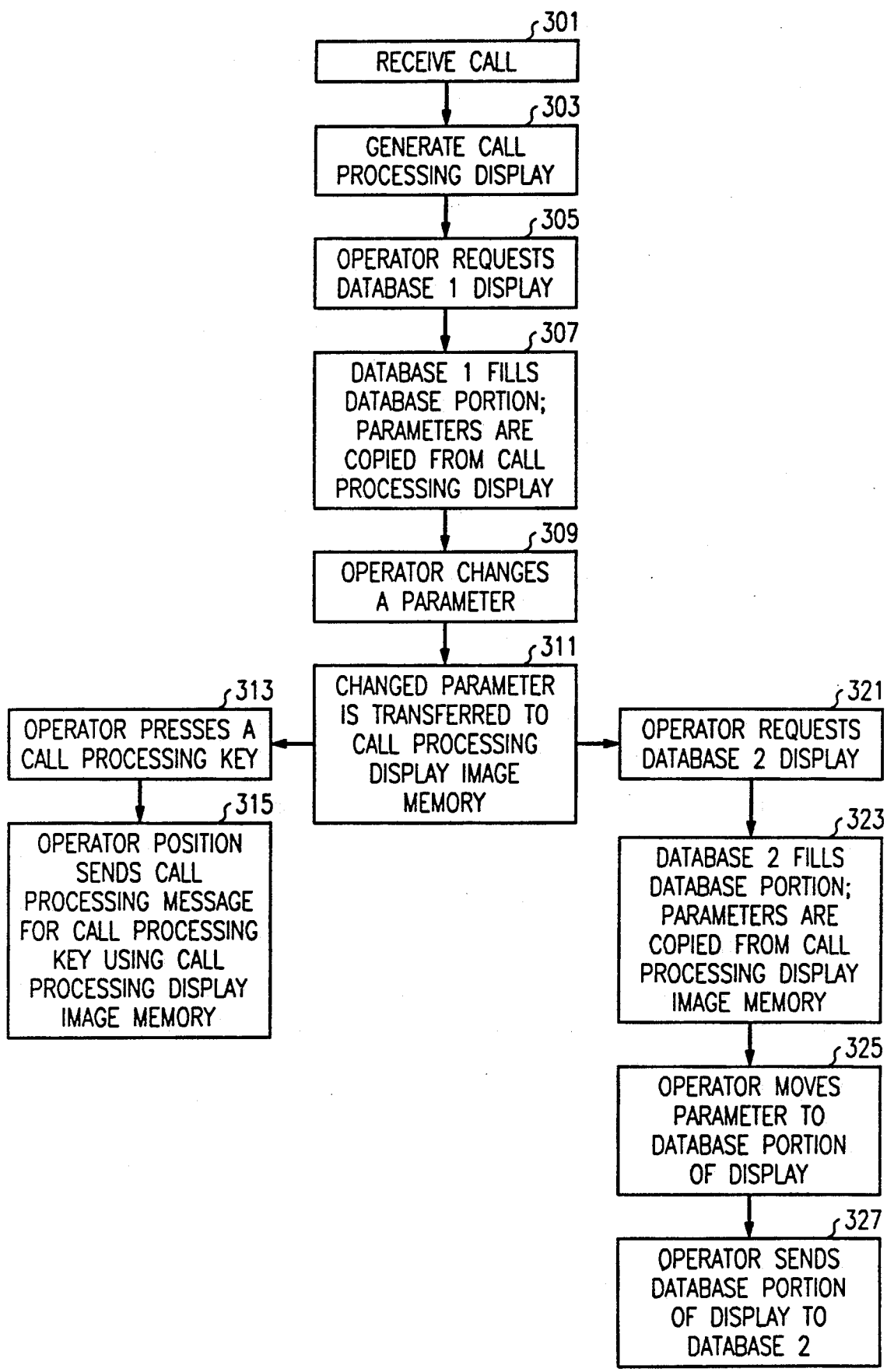

TELEPHONE OPERATOR AND AGENT TO DATABASE COMMUNICATION ARRANGEMENT

TECHNICAL FIELD

This invention relates to apparatus and methods for communicating between telephone operators or business agents and database(s) and call control systems.

Problem

In modern telephone operator assistance systems such as the operator service position system associated with the 5ESS ® switch and described, for example, in *The AT&T Technical Journal*, July/August 1985, and in N. X. DeLessio et al.: "An Integrated Operator Services Capability for the 5ESS Switching System, *International Switching Symposium*, Session 22C, Paper 3, May 1984, pages 1-5, operators are connected to a switching system and database by a combined voice and data facility such as that provided by an integrated services digital network (ISDN) connection. This allows the operators to communicate verbally with the telephone customer while receiving and transmitting data over a data channel. The data that the operator receives is data describing the call and including, for example, the originating telephone customer's telephone number as identified by automatic number identification (ANI) and forwarded to the operator position from the local switching system connected to the customer. It may also contain information such as a called telephone number and a calling card (credit card) number supplied by the originating customer. This data is displayed for the operator at a video display terminal that is part of an operator position as described, for example, in J. Collins et al.: U.S. Pat. No. 4,656,624. The operator examines this data and may use this data to query one or more databases. For example, the operator may verify the calling card number to make sure that the calling customer is using a valid calling card, or may access another database if directory assistance service is required on this call. Subsequently, the operator may change one or more of the parameters supplied in the call such as the called directory number if this was not originally supplied through dialing and can then cause the call to be set up through pressing an appropriate key on the operator position keyboard.

A problem with the prior art is that relatively substantial time is required on the part of an operator when that operator needs to communicate with one or more databases as well as a call processing system. The arrangements for transferring data received from one database to another database or to use such data for controlling calls are inefficient and use a substantial amount of operator time. As can readily be imagined, each second of operator time is extremely valuable since a typical operator assisted telephone call requires only about 30 seconds of work time so that a decrease in that time permits an operator to handle many more calls over an operator's work shift. With the present arrangement, an operator must remember (or write down) data received from a database and enter this data into the appropriate portion of the call control data screen using the keyboard.

Solution

The above problem is alleviated and an advance is made over the prior art in accordance with our invention wherein a portion of each screen associated with a database is reserved for parameter data which data is automatically transferred among screens whenever a different database is accessed. Advantageously, such an arrangement permits data from a screen associated with one database to be readily moved to a screen associated with another database or the call processing system.

When a call is originally received in an operator assistance system, an initial call processing screen is displayed for the operator, the screen comprising data about the call from the call processor of the system. The data comprises a group of parameters. Data for controlling a display is stored in a memory for storing the image data for a plurality of displays or screens. In response to receiving this display, the operator may request data from a database using an input device such as a keyboard. When this latter data is accessed and returned for display to the operator, that data is displayed along with the group of parameters originally displayed with the call processing screen. The operator may then modify one or more of the parameters, using a keyboard or other display control device, perhaps by moving data from the database into the position of the parameters. In a departure from the prior art, when a parameter is so modified, the modified parameter is substituted by the screen display control program for the original parameter in the image data for all the screens for the call. In a further departure from the prior art, the operator can then issue call control commands, for example, by operating keys, to effect further call control actions, such as establishing the call, and these commands will cause call control messages to be generated using the modified version of the parameters; the operator need not recall the call processing screen to issue these call control commands. Advantageously, operator work time is saved by automatically updating the parameters in all screens and by permitting the operator to issue call control commands without recalling the call processing screen.

In accordance with another aspect of the invention, the parameter portion of the screen occupies a standard position for screens for communicating with different databases. The contents of the parameter portion are automatically updated to the latest version whenever a database screen is displayed. A standard location for parameters permits a number of independent vendors to control a standard database portion of a screen.

In accordance with another aspect of the invention, memory is provided for maintaining a copy of the screen associated with each of the databases accessed by the operator position. Advantageously, this means that the database need only be updated when necessary after the call transaction based on the database access has been completed and each database need be accessed only once during each such transaction to obtain the necessary data.

In accordance with another aspect of the invention, when an operator logs into the system, the system derives authorization data in the office database of the operator assistance system from the operator's identification and password. This includes authorization for the work attributes of the duty assigned to that operator, as identified by the operator's identification. Duties include, for example, toll and assistance or directory assistance. In response to this authorization, switched virtual circuits are set up from the operator position to the various databases to which the operator is authorized to access. Switched virtual circuits are used because different types of terminal connections may be needed for the same operator at different times, since the operator may be assigned different duties at different times. By using a switched virtual circuit and automatic logon, the system automatically brings up the right terminal connection based on the operator identification and the work schedule. When the operator finishes, the switched virtual circuit is torn down and the system will bring up a different terminal connection for a later operator who has been assigned different work duty.

In one specific embodiment of the invention, switched virtual circuits are set up to 6 such databases out of a possible 15. If the operator needs to access another database not among the six, the operator sends instructions to the operator assistance switch to set up this additional virtual circuit and to disconnect one of the six switched virtual circuits previously established. Subsequently, a new switched virtual circuit is established after the additional virtual circuit has been disconnected. Advantageously, these virtual circuits are switched providing great flexibility to the operators.

In accordance to one specific implementation of this invention, the switched virtual circuits are established over a D-channel of an ISDN connection between the operator position and the operator assistance switch. This D-channel may be direct in case of a basic rate interface (BRI) or may be through concentration in case of a primary rate interface (PRI). The connection between the operator and the operator assistance switch is on the D channel of the BRI. The switched virtual connection between the operator assistance switch and the external database is on the D channel of a BRI, B channel of a BRI, B channel of a PRI, or an X.25 protocol sent over a 64 kilobit/second channel of a T-carrier line.

While the above discussion has been in terms of operators, the arrangements can also be used for agents connected under the control of an automatic call distributor who also have needs to access databases and in some cases, to make call connection requests. For example, the agents may be connected to databases for placing orders, for verifying customer credit, for getting descriptive information concerning products, and for routing calls to specific dealers or repair services. Data, for example, a customer identification, is often required to be transferred from one display to another, for making a database entry. The facilities described above for operators can also be used by such agents.

BRIEF DESCRIPTION OF THE DRAWING

FIG. 3 is a flow diagram of actions performed at an operator position in accordance with the principles of this invention.

DETAILED DESCRIPTION

Figure 1:
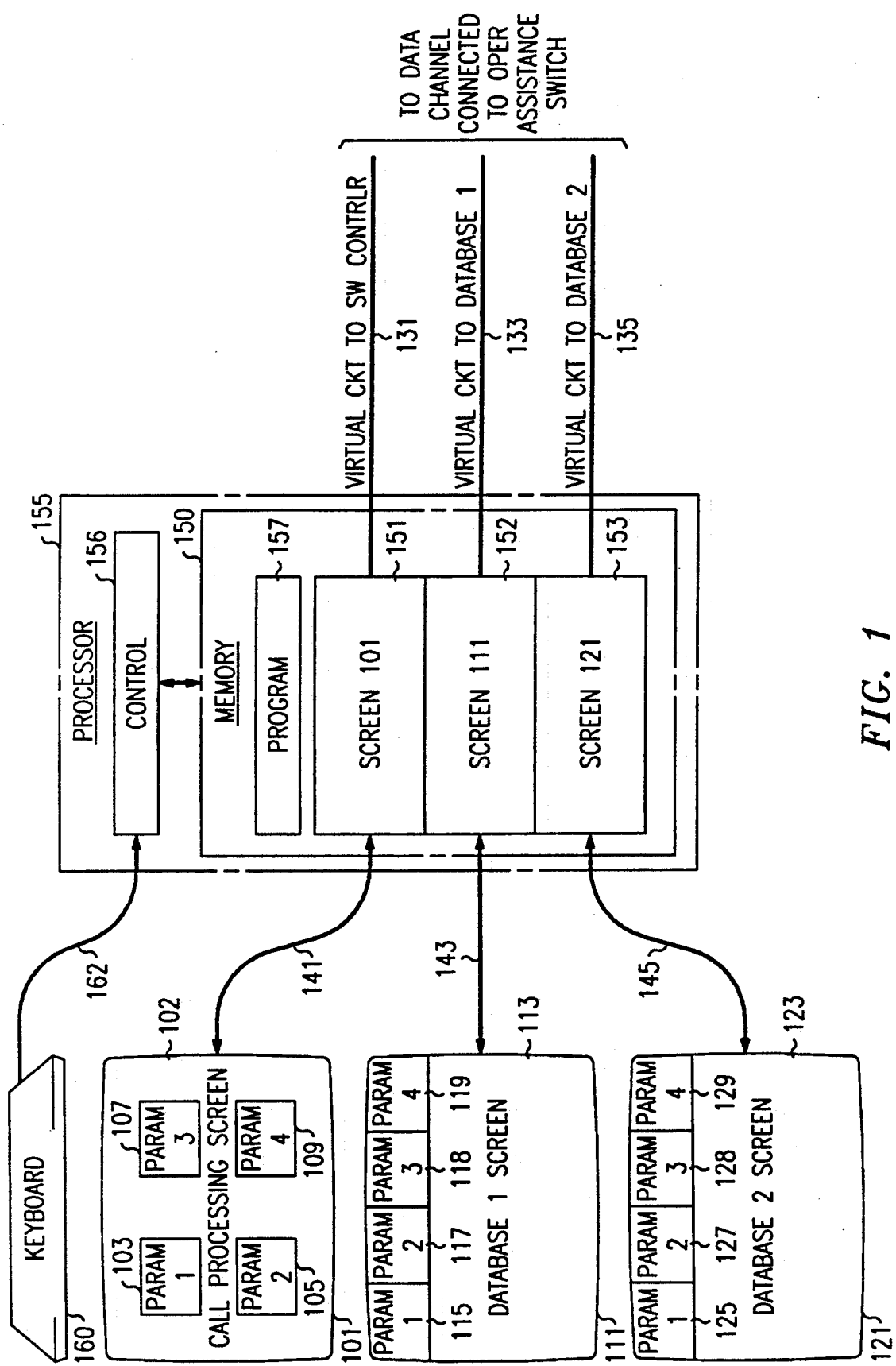
FIG. 1 illustrates the memory layouts of an operator terminal communicating with two databases and the controller of an operator assistance switching system.

FIG. 1 illustrates the screens of data that will be displayed before an operator in accordance with the principles of this invention. The operator position keyboard 160 is connected by a data channel 162 to processor 155 of the operator assistance switching system. FIG. 1 shows several kinds of elements. Screens 101, 111, and 121 represent the visual content of an operator display terminal at different times, depending on whether the operator has just received a call from the system (screen 101) or has received data from a database (screen 111 or screen 121). Processor 155 includes memory 150, including therein a program 157 for controlling the operations of control 156 of the processor. Block 150 is a memory which contains the image of data for display as screen 101, screen 111 or screen 121 and channels 131, 133, and 135 are virtual channels for communicating between sections of memory 150 and the switch controller of the connected operator assistance switching system or database 1 or database 2. While the specific embodiment permits communication with six databases, in FIG. 1 only two of these databases are shown. Three virtual channels 131, 133, and 135, communicate with memory 150 which contains segments 151 for storing screen 101, 152 for storing screen 111, and 153 for storing screen 121. Screen 101, the call processing screen, comprises general call processing data 102, and four parameters: parameter 1 displayed in area 103, parameter 2 displayed in area 105, parameter 3 displayed in area 107, and parameter 4 displayed in area 109. When a call is initially received, data is transmitted over the virtual channel 131 from a switch controller of the operator assistance switch to memory 150 for storage in area 151. The data is then transferred from memory area 151 onto call processing screen 101. If, subsequently, the operator wishes to access database 1, data from database 1 is sent over virtual channel 133 to area 152 of memory 150 for storing the contents of screen 111. In addition, parameters 1, 2, 3, and 4 are effectively transferred from the appropriate portion of memory area 151 into the appropriate portion of memory area 152. In the actual implementation, the parameters are stored in one area. The parameters are moved from screen 101 to screen 111 or 121 for use by the operator and the database. Examples of parameters are the calling number as identified by Automatic Number Identification (ANI), the called number, the billing number, and a status indicator.

The contents of memory area 152 are then used to load screen 111 which comprises database screen 1 (area 113) comprising data obtained from database 1 and areas 115, 117, 118, and 119 for storing parameters 1, 2, 3, and 4, respectively, the latter parameters having been obtained from data originally displayed in screen 101. Similarly, if the operator subsequently wishes to access database 2, information from database 2 is sent over virtual channel 135 to area 153 of memory 150 which is augmented by data representing parameters 1, 2, 3, and 4 as stored in area 151 of memory. Data from block 153 is used for controlling section 123 of data screen 121, while data from block 151 is used for controlling sections 125, 127, 128 and 129 of screen 121. The data for the parameters is always stored within one of the blocks, such as block 151 of the memory, and is then used to control the parameter area of the screen.

The memory 150 communicates with the screens over conceptual channels 141 (screen 101), 143 (screen 111), and 145 (screen 121). Physically, this is a single connection from the single memory to a single display device.

For reasons to be discussed below, whenever any of the parameters are changed in screen 121 or 111, the corresponding area for storing screen 101 (area 151 of memory 150) is updated with a new value of the changed parameter.

The operator's keyboard contains keys not only for modifying the contents of a displayed screen, but also for controlling call setup or disconnect operations. When an operator presses one of these call control keys, the operator position transmits data representing the request associated with the key and data for the call processing screen 101 to the switch controller of the operator assistance switching system. The contents of call processing 101 are transmitted as represented within memory 151 so that it is unnecessary for the operator to request a display of the call processing screen 101 prior to operating one of the call control keys.

In the preferred embodiment described herein, the screens are retained in the memory of the processor or processor complex of the switching system. In alternative embodiments, the screens can be retained in memory of the operator's or agent's position equipment.

Figure 2:
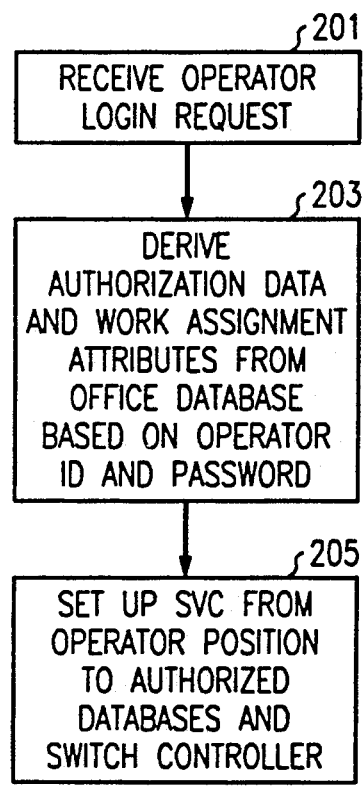
FIG. 2 is a flow diagram of operations performed in response to an operator login request.

FIG. 2 is a flow diagram of actions performed in the operator assistance switching system when an operator logs into the system at the beginning of a work shift. The system receives an operator login request (action block 201) and based on the identification and password supplied by the operator, derives authorization data and work assignment attributes in the office database (action block 203). This authorization data represents identifications of the database which that operator is authorized to access. The operator assistance switching system then sets up permanent virtual circuits between the operator position and the authorized databases (action block 205). This setup action includes informing both the database and the operator position of the addresses to be used in the headers for using each of the switched virtual circuits. The work assignment attributes are derived as follows. With the operator ID and the current date and time, the switch retrieves office data and the serving team the operator is supposed to be assigned to. The call types handled by a specific serving team, and hence the equipment required, are part of the system data. Hence, the system automatically retrieves the right set of databases, sets up the switched virtual circuits to these databases and passes the operator's identification to the databases for authorization.

FIG. 3 is a flow diagram of the actions performed by an operator and the operator position in processing a typical call. A call is received (action block 301). The call processing screen 101 is displayed based on data received from the connected operator assistance switching system (action block 303). Based on data observed on the call processing screen, the operator requests a screen of data from database 1 (action block 305). In making this request, the operator may pass a parameter identified by a controllable cursor on the call processing screen 101 to database 1 in the request message in order that database 1 responds with data pertinent to this call. For example, the parameter might be a calling card number.

For some types of calls, for example, calls for directory assistance, no initial call processing screen is required. For these calls, the initial screen is one supplied by one of the databases, the database being selected on the basis of authorization data provided at the time of login, and on the type of call as recognized by the operator assistance switch.

In response, the database 1 sends a message over virtual channel 133 to fill block 152. The parameters are copied from area 151 directly into screen areas 115, 117, 118 and 119. Based on the contents of area 152 of memory 150, the screen 111 is displayed comprising data area 113 supplied from database 1, and parameter area 115, 117, 118, and 119 derived from the call processing screen 101 and previously stored in area 151 of memory 150 (action block 307). Based on the data displayed or data received verbally from the calling customer, the operator may change one or more of the parameters (action block 309). The changed parameter may, for example, represent a new called number if the call is to be redirected, or a different calling number if the call is to be billed to a third party. If a parameter is changed, this changed parameter value is automatically transferred to memory block 151 for storing screen 101, the call processing screen (action block 311). If, thereafter, the operator presses a call processing key, such as a complete call key (action block 313), then the operator position responds by sending a call processing message corresponding to that call processing key and comprising data based on the contents of block 151 of memory which have been updated with a new value of the parameter (action block 315). It is not necessary for the operator to change a parameter on the call processing screen, since the action performed in action block 309 automatically updates the image memory of the call processing screen. Thus, when the operator presses the call processing key, the call processing message will be based on the changed value of that parameter. Note that whether or not a parameter is changed, it is not necessary for the operator to recall the call processing screen before operating a call processing key.

Alternatively, the operator responds to the displayed contents of database 1 by requesting access to database 2. This request can be made with or without changing one of the parameters. If the operator requests a database 2 screen (action block 321), then database 2 responds with a message which fills the database screen 2 portion (123) of the screen 121 memory (block 153 of memory 150) and the parameters section of screen 121 is filled from the corresponding contents of block 151. (Block 151 is always updated to the latest version of the parameters). Screen 121 is then displayed based on the contents of block 153 of memory 150 (action block 323). If, at this point, the operator wishes to write data into database 2, for example, by writing the contents of one of the parameters from area 125, 127, 128, or 129 into some portion of area 123 of the database screen, block 153 of memory 150 will be updated to reflect this change (action block 325). The section of area 153 representing database screen 2 (area 123) is then sent over switched virtual circuit 135 to database 2 to update that database (action block 327).

What has been illustrated in FIG. 3 is that an operator can communicate directly between database and call processing screens by changing a parameter and can communicate with database by moving the changed parameter from the parameter area of the screen to the database portion of the screen, all without having to re-enter data. Further, the operator can press the call processing key at any time and have the call processed in accordance with the latest version of each parameter in the call processing screen. In the particular implementation being described herein, two of the four parameters are used for call processing data, and two of the parameters are generally available for passing data among database screens or between a database screen and the call processing screen.

While the above discussion has been in terms of operators, the arrangements can also be used for agents connected under the control of an automatic call distributor who also have needs to access databases and in some cases, to make all connection requests. For example, the agents may be connected to databases for placing orders, for verifying customer credit, for getting descriptive information concerning products, and for routing calls to specific dealers or repair services. Data, for example, a customer identification, is often required to be transferred from one display to another, for making a database entry. The facilities described above for operators can also be used by such agents. For other applications, the number of parameters may be higher. It is desirable to have a standard number of parameters and a standard portion of the screen set aside for all of the database screens in order to permit different vendors to supply different databases and to be restricted from using a standard portion, i.e., the parameter portion of the screen. The call processing screen may have the parameters located in different sections of the screen to optimize the human interactions between the operator position and operator.

While in this embodiment of the invention the operator position includes memory 150 for storing the data for a plurality of screens, in other embodiments, this memory, or all but the portion for controlling the display, can be part of the memory of the operator assistance switch.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In an operator assistance switching system comprising a display device, an input device, and memory for storing image data for a display, a method of processing an operator assistance call comprising the steps of:
   responsive to receipt of a call in said operator assistance switching system, displaying call processing data, including a group of parameters, for said call in a call processing display and storing image data for controlling said call processing display;
   responsive to a first input received from said input device, requesting additional data from a database and displaying said additional data and said parameters on a database display and storing image data for controlling said database display;
   responsive to a second input received from said input device, modifying one of said parameters in said database display and automatically modifying said image data for controlling said database display and said call processing display to control displays including said modified parameter.

2. The method of claim 1 further comprising:
   while displaying said database display including said modified parameter, responsive to receipt of a third input from said input device, generating a call control message, using said modified parameter, for effecting a completion of a call.

3. The method of claim 2 wherein said input device is a keyboard and wherein said third input is depression of a call control key of said keyboard.

4. An operator assistance switching system comprising:
   a display device;
   an input device;
   memory for storing image data for controlling a plurality of displays;
   means, responsive to receipt of a call, for displaying a call processing screen of data, comprising a group of parameters and for controlling storing of image data for said call processing screen in said memory;
   means, responsive to a first input from said input device, for removing said call processing screen from said display and substituting a data screen comprising said group of parameters and data received from a database and for controlling storing of image data for said data screen;
   means responsive to a second input from said input device for modifying one of said parameters and for automatically modifying image data stored in said memory for said one parameter for said call processing screen.

5. The system of claim 4 further comprising:
   means responsive to receipt of a third input from said input device, said third input received while displaying said data screen, for generating a call control message, using said modified parameter, for effecting completion of said call.

6. The system of claim 5 wherein said input device is a keyboard and said third input is the depression of a call control key of said keyboard.

7. In an operator assistance system comprising a display device and an input device for an operator position and memory for storing image data of a display for said display device, a method of processing an operator assistance call comprising the steps of:
   responsive to receiving call processing data for and displaying a call processing display on said display device, said call processing display comprising call processing data, comprising parameters, for said call, accessing a database using said call processing data;
   responsive to receiving additional data from said database in response to said accessing, displaying a data display on said display device, said data display comprising said additional data and said parameters;
   modifying at least one of said parameters while displaying said data display; and
   following said modifying, responsive to a signal from said input device, transmitting a call control message for effecting a call control action, using said parameter modified in said modifying step, prior to any requesting of a display of data for said call processing display.

8. The method of claim 7 further comprising:
   automatically updating image data in said memory of said first display to reflect a modified value of said at least one of said parameters.

9. The method of claim 8 further comprising:
   storing image data for said call processing display responsive to receiving said call processing data; and
   storing image data for said data display responsive to receiving said additional data.

10. The method of claim 8 further comprising:
    prior to receiving said call processing data, logging into said system from said operator position; and
    responsive to said logging operation, authorizing said operator position to access said database.

11. The method fo claim 10 wherein said authorizing comprises authorizing accessing said database via a switched virtual circuit.

12. The method of claim 1 wherein said authorizing further comprises setting up a switched virtual circuit from said operator position to said database.

13. The method of claim 8 wherein said displaying steps are responsive to data received over a combined voice and data facility.

14. The method of claim 13 wherein said combined facility is an Integrated Services Digital Network (ISDN) facility.

15. An operator assistance system, comprising:
- an operator or agent comprising an input device and a display device;
- memory for storing a plurality of screens for said device; and
- processor means, operative under the control of a program for;
- responsive to receiving a first display for said display device, said first display comprising first data for said call, said first data comprising parameters, controlling accessing a database using said first data;
- responsive to receiving a second data from said database in response to said accessing, controlling displaying a second display on said display device, and second display comprising said second data and said parameters;
- responsive to receipt of first input data from said input device, modifying at least one of said parameters while displaying said second display; and
- responsive to receipt of second input data from said input device, controlling transmitting a call processing message for effecting a call control action, using said parameter modified in said modifying step, prior to receipt of any request of a display of data for said first display.

16. The operator assistance system of claim 15 wherein said processor means comprises memory means for storing image data for controlling displays of said first display, said second display and said parameters.

17. The system of claim 15 further comprising a switched virtual circuit connecting said processor means and said database for accessing said database from said processor means.

18. The system of claim 15 wherein said operator position and said database are connected by a switch virtual circuit.

19. The system of claim 18 wherein said virtual circuit is carried between said operator position and said operator assistance system over a data channel of an integrated voice/data facility.

20. The system of claim 19 wherein said integrated facility is an ISDN facility.

21. The system of claim 15 wherein said input device is a keyboard.

22. The system of claim 21 wherein said second input data is supplied by depressing a call control key of said keyboard.

23. In an operator assistance system comprising a display device, and a keyboard comprising a call processing key for an operator position, and memory for storing image data for controlling a display for said display device, a method of processing an operator assistance call comprising the steps of:
- logging into said system from said operator position;
- responsive to said logging operation, authorizing said operator position to access a database via a switched virtual circuit;
- responsive to receipt of said call, transmitting data for controlling a display to said operator position;
- responsive to receiving said data from said operator assistance system, over a combined voice and data facility, for displaying a first display of said display device, said first display comprising first data, said first data comprising parameters, for said call, accessing said database using said first data;
- storing image data for controlling said first display responsive to receiving said first display;
- responsive to receiving second data from said database in response to said accessing, displaying a second display on said display device, said second display comprising said second data and said parameters;
- storing image data for controlling said second display responsive to receiving said second display;
- responsive to receipt of an input from said keyboard, modifying at least one of said parameters while displaying said second display;
- automatically updating in said memory, image data for controlling said first display, to reflect a modified value of said at least one of said parameters; and
- following said modifying, operating said call processing key for transmitting a call control message for effecting a call control action, using said modified value of said at least one parameter, prior to any requesting a display of data for said first display.

* * * * *

UNITED STATES PATENT AND TRADEMARK OFFICE
CERTIFICATE OF CORRECTION

PATENT NO. : 5,012,512

DATED : April 30, 1991

INVENTOR(S) : Richard J. Basso, Randall S. Hansen, Edward P. Kolasa, Mark L. Reynolds, Chun P. Tam It is certified that error appears in the above-identified patent and that said Letters Patent is hereby corrected as shown below:

Column 8, claim 11, line 66, delete "fo" and substitute --of--.

Column 9, claim 12, line 1, delete "1" and substitute --11--.

Column 9, claim 15, line 11, after "agent" insert --position--.

Column 9, claim 15, line 16, delete ";" and substitute --:--.

Column 9, claim 15, line 22, delete "a".

Column 9, claim 15, line 25, delete "and" and substitute --said--.

Column 9, claim 18, line 46, delete "switch" and substitute --switched--.

Signed and Sealed this

Fifteenth Day of December, 1992

Attest:

DOUGLAS B. COMER

*Attesting Officer*     *Acting Commissioner of Patents and Trademarks*